United States Patent Office 3,794,506
Patented Feb. 26, 1974

---

3,794,506
CEMENTITIOUS COMPOSITIONS CONTAINING PHOSPHONIC ACID
Donald L. Schmidt, Midland, Ronald H. Cooper, Clare, and Gerald H. Brandt, Midland, Mich., assignors to The Dow Chemical Company, Midland, Mich.
No Drawing. Filed Oct. 2, 1972, Ser. No. 294,330
Int. Cl. C04b 7/02, 7/34
U.S. Cl. 106—90
11 Claims

ABSTRACT OF THE DISCLOSURE

An improved cementitious composition curable by hydration and having enhanced properties, such as less water absorbency, decreased spalling or greater strength retention, comprises a cementitious material and a small but effective amount of a phosphonic or phosphinic acid or soluble salt thereof containing various hydrophobic substituents.

BACKGROUND OF THE INVENTION

Cementitious materials have long been used both as a structural material and as a binder. Chief among these materials are the hydraulic cements. The term, hydraulic cement, as used herein, means one which, when admixed with water (or brine) sets to a solid mass. Portland, aluminous, and pozzolan cements and mortar, lime, slag and expansive mements are illustrative of hydraulic cements. Portland cement is by far the most widely used and reference thereto may be made herein as generally illustrative of the hydraulic cements.

Hydraulic cement is used by admixing it with water or an aqueous solution to make a slurry which is emplaced as desired in a space or void or within confining forms and which thereafter sets to a solid mass through a process of hydration which proceeds chiefly by forming a high strength matrix of interlocking crystals. When the aqueous slurry consists essentially of only the cement and water or aqueous liquid (e.g. a brine) when set, it is known as neat cement but when such slurry contains sand and optionally other modifiers, it is known as mortar and when it contains gravel as well as sand, the set mass is known as concrete.

Among the many uses of hydraulic cement compositions is that requiring the slurry to set in water or brine or in a high humidity atmosphere wherein resistance to excessive absorption of water by the cement composition is important if the set cement is to have a long life. It has been well established that the greater the resistance to absorption of water and to aqueous solutions of salts, such as are encountered in the form of deicing materials, the longer the life of the concrete or cement. Scaling, spalling, pitting, cracking, and other indications of degradation of the concrete or set cement are greatly accelerated by the amount of water or brine, or of moisture from the air which is absorbed e.g. during alternate freeze-thaw and wet-dry conditions. Such uses include the construction on highways, bridges, docks, wharfs, pillars and supports therefor, curbs, sidewalks, dams, ramps, tunnel and shaft liners, barges and decks thereof, footings and foundations, retaining walls, and masonry structures of various types.

In addition, it has long been known to improve the strength of earth soil for bearing weight by mixing portland cement or lime with the soil under such conditions that the cement or lime hydrates and "sets." The resulting soil, while not a building material comparable with portland cement concrete, typically has load-bearing and other properties adapted to engineering uses much improved over unmodified earth soil. Such modification of soil in connection with construction has became a standard practice, available to the construction engineer when needed.

THE PRIOR ART

U.S. 2,243,501 to Daimlec et al. teaches the use of phosphoric acid and phosphorous acid esters in cement mixes to waterproof concrete.

Organic substituted phosphonic or phosphinic acids are well known.

SUMMARY OF THE INVENTION

The present invention resides is the combination of a cementitious material and either a phosphonic acid, a phosphinic acid or an alkali metal salt thereof. The result is a composition adapted to be cured upon hydration to a solid having improved properties.

The cementitious material is a hydraulic cement which is typically a mineral material that when wetted with water changes from a finely to coarsely divided material to a continuous hardened material. Portland cement is representative as are also burned or slaked lime, plaster-of-Paris, the mixture of burned and broken clam or oyster shells with clay.

Most commonly the combination will be utilized together with an aggregate such as sand, gravel, stone, foamed slag or the like to form a concrete or mortar. Likewise, the combination may be used to stabilize earth soil to intrusion of moisture and other adverse influences.

A compound to be employed according to the present invention is of the formula

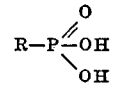

or

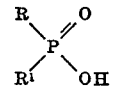

or the alkali metal salts thereof.

In the foregoing formula, R and R$^1$ in any occurrence is alkyl of from 6 to 18 carbon atoms.

Typical of the useful compounds are hexyl phosphonic acid, octyl phosphonic acid, n-decyl phosphonic acid, dodecyl phosphonic acid and octylphosphonic acid. Representative of the phosphinic acids are dihexyl phosphinic acid, diheptyl phosphinic acid, didecyl phosphinic acid, dihexadecylphosphinic acid and dioctadecyl phosphinic acid. Equally useful are the phosphinic acids with different substituent groups such as hexyl decyl phosphinic acid, octyl decyl phosphinic acid, and hexyl dodecyl phosphinic acid. Also included in the scope are the alkali metal salts of the acids.

In one manner of practicing the invention, the compound above set forth is mixed, dry, or in water or other carrier, into a mixture which is to be prepared into a hardened hydraulic cement concrete, at any time prior to the hardening of such mixture into a hardened concrete, and, except for the presence of such compound, conventional materials and means are used to prepare the finished concrete. Such other carrier can be an organic solvent such as carbon tetrachloride, kerosene, acetone, or the like. Lower alkanols and glycols are contraindicated.

In yet another embodiment of this invention, an article is prepared of conventional hydraulic cement concrete and it is finished and placed in such manner as to harden, conventionally, and, prior to such hardening, its surface is treated, as by spray, wash, flood, splash, dust, troweling, or otherwise, to apply to a surface which, upon the completion of the preparation of the concrete article, is to be an exposed surface, a compound of the instant invention or a composition presenting the same.

The invention can be used to stabilize a soil. It is assumed that such soil will at least part of the time contain at least some natural soil moisture. The soil can be exposed, or exposed in part, as a steep embankment adjacent a cut through a hill, where it is desired to control gulleying and washing of soil; it can be buried as under the foundation of a building or beneath a paved road; it can be in a situation normally exposed to high water table as in the earth behind rip-rapping along a river bank; or earth fill surrounding a stone well. The concrete comprising modified soil can be buried at a more or less uniform depth of from about 4 to about 120 inches, typically about 18 inches, beneath the surface of an agricultural soil, where it can function as a barrier to drainage, to improve retention of soil moisture. It can be cut into orderly pieces that are then used as building blocks; or such blocks can be preformed molds of desired shape and size. Such blocks can then be used for paving, rip-rapping, in structural walls, and the like. The location and exposure of concrete comprising soil according to the present invention are matters essentially of indifference in the present invention.

The phosphonic acid or phosphinic acid or alkali metal salt thereof can be varied within wide limits. The optimum amount in any given situation will vary with the end use of the cured composition and with the identity of the ingredients in the composition. Thus, the optimum amount to be used in a concrete may not necessarily be the same amount to be used in earth soil stabilization. Simple range finding tests will quickly establish levels to be used. As a guideline amounts in the range of about 0.05 weight percent to about 5 weight percent based on the weight of cementitious material will suffice.

The amount of cementitious material relative to the aggregate will be those known in the art. In making a cement mortar or concrete it is commonplace to employ about 3 to 5 parts aggregate to one part hydraulic cement. In stabilizing earth soil the cementitious material will usually be in an amount of from about 2 to 16 precent of the dry soil weight. The concept of the invention is independent of the cement/aggregate ratio however.

It is believed that the statement, foregoing, will enable those skilled in the arts of the chemistry of cementitious materials to provide themselves with necessary additives, and prepare a concrete material according to the instant invention and to enjoy the full benefit thereof.

In all details, it is to be assumed that, but for the practice of the instant invention, the techniques employed in the preparation of a cementitious product comprising aggregate together with portland cement or lime will be techniques of the prior art intended and expected to yield a product of good properties. Mixing is to be thorough, compacting and placing are to be vigorously carried out, added moisture is to be held at a minimum and mobility achieved by working the material rather than by the addition of excess water; and other techniques adapted to produce a good product are to be observed.

A concrete material hardenable by reason of hydration of hydraulic cement together with aggregate filler, modified according to the present invention, hardens and yields a hardened product indistinguishable on superficial appearance from the unmodified product of the prior art. Hardening times, rates of increase of load-bearing strength, ultimate strength attained, and the like appear to be quite like those of the prior art. However, the products prepared with the benfit of the present invention presserve their strength under adverse exposure which tends promptly to degrade concrete of the prior art.

In particular, while the concrete of the prior art is susceptible to prompt and severe degradation and loss of strength through freezing and thawing; or in the case of concrete with earth soil for aggregate, is susceptible to severe loss of strength from moisture alone. Concrete of this invention shows much improved resistance to these adverse influences.

Moreover, in such applications as paving, curbs, traffic control islands, and the like, concrete is often subjected to salts in solution, as these materials are used for control of ice and snow in winter. As moisture dries away, the concentration can vary from infinitely small to pure, solid salt substance. Such solutions are almost never washed or flushed from concrete, but permitted to be removed by weather and the like. Such snow and ice control salts seriously degrade the concrete of the prior art; the concrete of the present invention is quite resistant to such degradation.

EXAMPLE 1

(A) Soil-portland cement

Dried silty cloy soil (42 percent clay, 47 percent silt and 11 percent sand) 497.6 g. was mixed with 19.2 g. of portland cement. This mixture was brought up to an "optimum" moisture content for compaction by spraying 61.4 g. of water into the admixture while subjecting it to further mixing. After a uniform admix was obtained, 85 g. aliquots were placed in a cylindrical molding tube 3 cm. in diameter and compressed from both ends in a hydraulic press at a pressure of 640 p.s.i. until a static condition was attained. The molded specimen was then ejected from the molding tube and cured in a 100% relative humidity atmosphere for seven days at 140° C. This results in a series of soil-cement specimens (3 cm. x 6 cm.) containing 4% portland cement based on the air-dry weight of soil. After curing the specimens were air dried for 24 hours then immersed in water for 24 hours before testing.

The procedure was repeated except that the appropriate quantity of phosphonic acid dissolved in acetone was added to the water and sprayed onto the soil-cement mixture while subjecting it to further mixing. In this manner identical specimens containing 4% cement and various concentrations of phosphonic acid compound based on the dry weight of soil, were prepared.

The average strengths and moisture contents of triplicate samples for various tests are shown in Table I.

(B) Soil-lime

The same dried clay soil as in (A), 497.6 g., was intimately blended with 14.4 g. (3% based on dry wt. of soil) of high calcium lime (98% CaO). Water, 81.3 g., was sprayed onto the mixture while subjecting it to further mixing. This admix was then molded into 3 cm. x 6 cm. specimens in a manner identical to that described in the above example.

Specimens were prepared in a similar manner except the mixing water contained an appropriate quantity of phosphonic acid compound dissolved in acetone.

These lime stabilized soil specimens were double wrapped in aluminum foil and cured for 10 days at 140° F. After this curing period the specimens were removed from the aluminum foil, air dried 24 hours, and then immersed in water for 24 hours before determining their unconfined compressive strength and moisture contents. The average strengths and moisture contents of triplicate cores for various tests are shown in the following table.

The specimens were tested for unconfined compression strength, using a standard commercial tester for that value. In the tester, the cylinder of material under test is positioned with its flat end horizontal, one resting on, and the other supporting a pressure plate with a strain gauge actuated by deformation of a proving ring to indicate pressure between the plates. A screw mechanism with mechanical drive closes the distance between the pressure plates at a predetermined rate, presently 0.05 inch per minute.

The highest pressure attained before collapse of the sample is regarded, for purposes of the present tests, as unconfined compressive strength (UCS) of the material.

TABLE I

| Chemical treatment | Concentration, percent dry soil wt. | Portland cement, 4% | | Quicklime, 3% | |
|---|---|---|---|---|---|
| | | UCS, p.s.i. | Moisture, percent | UCS, p.s.i. | Moisture, percent |
| No cement or lime | | 0 | 54.9 | | |
| Cement or lime alone | | 29 | 24.5 | 245 | 19.8 |
| $RPO(OH)_2$: | | | | | |
| $R=C_8H_{17}$ | 0.1 | 44 | 18.5 | | |
| $R=C_{10}H_{21}$ | 0.05 | | | 316 | 18.9 |
| | 0.10 | 73 | 20.0 | 412 | 18.7 |
| | 0.25 | 89 | 18.6 | 394 | 18.7 |
| | 0.50 | 70 | 18.3 | 300 | 18.9 |
| $R=C_{12}H_{25}$ | 0.1 | 79 | 18.3 | 276 | 18.5 |
| | 0.1 | 70 | 19.8 | | |
| $R=C_{18}H_{37}$ | 0.1 | 22 | 21.5 | | |

When the phosphonic acid compounds were added to soil in the same procedure as above but without cement or lime the results showed no improvement in unconfined compressive strength although the percent moisture absorption was about one-half of an untreated control.

EXAMPLE 2

To 1 part of cement was added 2.75 parts of graded, standard sand by weight (ASTM designation: C-109-64). The mixing was done mechanically in a mix-muller in accordance with the ASTM procedure given in section 6 of Method C-305-64T. The cement mortar mix consisted of 500 g. portland cement, 1375 g. graded sand and 240 g. of water. The mixing water and n-decylphosphonic acid were placed in the mixing bowl, followed by cement, and sand while subjecting the mixture to mixing according to C-305-64T procedure. The cement mortar was placed into two 3-gang, 2-inch cube molds according to ASTM procedure C-109-64. The specimens were covered with a wet cloth and allowed to harden overnight at room temperature. They were removed and placed in a 100 percent R.H. atmosphere for 28-day cures followed by air drying at 50 percent R.H. 73° F., for 24 hours.

The cubes were then subjected to slow freeze-thaw tests according to ASTM procedure C-202. The dried cubes were covered with a 3 percent NaCl solution to a depth of about one-half inch above the cubes. After twenty-four hours of soaking the cubes were drained, washed with fresh water, wiped dry and weighed. They were again covered with the 3 percent NaCl solution to a depth of about one-half inch over the cubes and placed in a freezer at 0° F. overnight Next, the cubes were thereafter allowed to thaw in the brine solution at room temperature whereupon the above procedure was reported. After a number of cycles data was taken and fresh brine introduced.

The following table shows the durability of the cement mortar cubes. The cubes were visually noted according to the scale and system taken from Axon et al., "Laboratory Freeze-Thaw Tests vs. Outdoor Exposure Tests," Highway Research Record, No. 268, August 1969, p. 35 wherein a value of 0 represents no scaling, 3 is moderate scaling and 5 is severe scaling.

| Admixture | Scaling index after various F./T. cycles | | | | | |
|---|---|---|---|---|---|---|
| | 1 | 3 | 7 | 16 | 25 | 30 |
| None | 0 | 4 | 5 | 5 | >5 | >5 |
| $C_{10}H_{21}PO(OH)_2$ | 0 | 3 | 3 | 3 | 3 | 4 |

The marked reduction in scaling in the modified mortar systems shows the utility of these phosphonic acid compounds as scale inhibitors.

Substantially the same procedures are carried out, in the matter of concrete of conventional mineral aggregate, concrete of expanded vermiculite aggregate, concrete of wood sawdust aggregate, concrete of perlite aggregate, concrete of expanded slag aggregate, concrete of gas-expanded bulk, and the like.

What is claimed is:

1. A composition of matter adapted to be cured upon hydration to obtain a solid comprising a cementitious material and an effective amount of an additive, said additive being a phosphonic acid compound of the formula

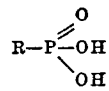

or a phosphinic acid compound of the formula:

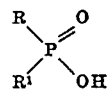

or an alkali metal salt of either of said compounds, wherein R or $R^1$ in any occurrence is alkyl of from 6 to 18 carbon atoms, inclusive.

2. The composition of claim 1 wherein the cemetitious material is hydraulic cement.

3. The composition of claim 2 wherein the hydraulic cement is portland cement.

4. The composition of claim 3 wherein the composition is a mixture of earth soil, portland cement and said additive.

5. The composition of claim 3 wherein the composition is a mixture of mineral aggregate, portland cement and said additive.

6. The composition of claim 2 wherein said hydraulic cement is lime.

7. The composition of claim 6 wherein the composition is a mixture of earth soil, lime and said additive.

8. The composition of claim 1 wherein said additive is octyl phosphonic acid.

9. The composition of claim 1 wherein said additive is decyl phosphonic acid.

10. The composition of claim 1 wherein said additive is dodecyl phosphonic acid.

11. The composition of claim 1 wherein said additive is octadecyl phosphonic acid.

References Cited

UNITED STATES PATENTS 3,346,487  10/1967  Irani et al. _____ 252—8.5
3,346,488  10/1967  Lyons et al. _____ 252—8.5

FOREIGN PATENTS 1,471,153  3/1969  Germany _____ 106—314

DELBERT E. GANTZ, Primary Examiner

S. L. BERGER, Assistant Examiner

U.S. Cl. X.R.

106—119, 287 SS, 314